United States Patent
Sun et al.

(10) Patent No.: US 8,833,508 B2
(45) Date of Patent: Sep. 16, 2014

(54) ELECTRICAL AUXILIARY MODULE FOR A VEHICLE STEERING SYSTEM

(75) Inventors: Fu-Shin Sun, Chiayi (TW); Jiun-Jie Chen, Yuanlin Township, Changhua County (TW)

(73) Assignee: Automotive Research & Testing Center, Lugang Chen, Changhua Hsien (TW)

( * ) Notice: Subject to any disclaimer, the term of this patent is extended or adjusted under 35 U.S.C. 154(b) by 131 days.

(21) Appl. No.: 13/605,645

(22) Filed: Sep. 6, 2012

(65) Prior Publication Data
US 2012/0329592 A1 Dec. 27, 2012

Related U.S. Application Data (63) Continuation-in-part of application No. 12/645,487, filed on Dec. 23, 2009, now abandoned.

(51) Int. Cl.
*B62D 5/04* (2006.01)

(52) U.S. Cl.
CPC ............ *B62D 5/0406* (2013.01); *B62D 5/0421* (2013.01); *B62D 5/0412* (2013.01)
USPC ......... 180/444; 180/443; 180/446; 74/388 PS (58) Field of Classification Search
USPC .................. 180/443, 444, 446; 475/149, 153; 74/388 PS
See application file for complete search history.

(56) References Cited

U.S. PATENT DOCUMENTS

| | | | | |
|---|---|---|---|---|
| 3,103,986 A | * | 9/1963 | Barton et al. | 180/428 |
| 5,145,021 A | * | 9/1992 | Nakamura et al. | 180/444 |
| 5,230,397 A | * | 7/1993 | Tranchon | 180/444 |
| 5,333,700 A | * | 8/1994 | Mouri | 180/444 |
| 6,026,925 A | * | 2/2000 | Nagao et al. | 180/444 |
| 6,637,540 B2 | * | 10/2003 | Kielar et al. | 180/402 |
| 7,306,535 B2 | * | 12/2007 | Menjak et al. | 475/29 |
| 7,412,906 B2 | | 8/2008 | Ponziani | |
| 7,665,572 B2 | * | 2/2010 | Yamanaka et al. | 180/444 |
| 8,006,799 B2 | * | 8/2011 | Yamanaka | 180/444 |
| 8,086,374 B2 | * | 12/2011 | Yamaguchi et al. | 701/42 |
| 2003/0196849 A1 | | 10/2003 | Menjak et al. | |
| 2004/0192485 A1 | * | 9/2004 | Severinsson | 475/149 |
| 2005/0279978 A1 | * | 12/2005 | Huang | 254/323 |
| 2009/0152044 A1 | | 6/2009 | Ito et al. | |
| 2009/0320536 A1 | * | 12/2009 | Taniguchi et al. | 70/252 |
| 2010/0106375 A1 | * | 4/2010 | Ahmed et al. | 701/42 |

* cited by examiner

*Primary Examiner* — Anne Marie Boehler
*Assistant Examiner* — Maurice Williams
(74) *Attorney, Agent, or Firm* — patenttm.us (57) ABSTRACT

An auxiliary module has a gearbox, a motor, a torque detector and a controller. The gearbox has a casing, a sun gear, a planet gear assembly, a driven gear and a driving axle. The planet gear assembly engages the sun gear and has a driving gear, multiple planet gears and an annular gear. The planet gears are mounted rotatably on the driving gear and engage the sun gear. The annular gear is mounted around and engages the planet gears. The driven gear engages the driving gear. The driving axle is mounted co-axially on the driving gear. The motor is connected co-axially to the sun gear. The torque detector is mounted on the casing of the gearbox with fasteners to detect torque applied on the driving axle. The controller is connected electrically to the motor and the torque detector to adjust torque output from the motor.

1 Claim, 13 Drawing Sheets

ELECTRICAL AUXILIARY MODULE FOR A VEHICLE STEERING SYSTEM

The present invention is a continuation-in-part application of the application Ser. No. 12/645,487, filed on Dec. 23, 2009.

BACKGROUND OF THE INVENTION

1. Field of the Invention

The present invention relates to an auxiliary module, and more particularly to an electrical auxiliary module for a vehicle steering system to improve mechanical efficiency of the steering system.

2. Description of Related Art

An auxiliary device is mounted on a vehicle steering system to provide an auxiliary torque/force for the steering system. However, the conventional auxiliary device is a specific design based on different types or structures of vehicles, so to design and to manufacture a conventional auxiliary device are sophisticated and time-consuming.

Figure 9:
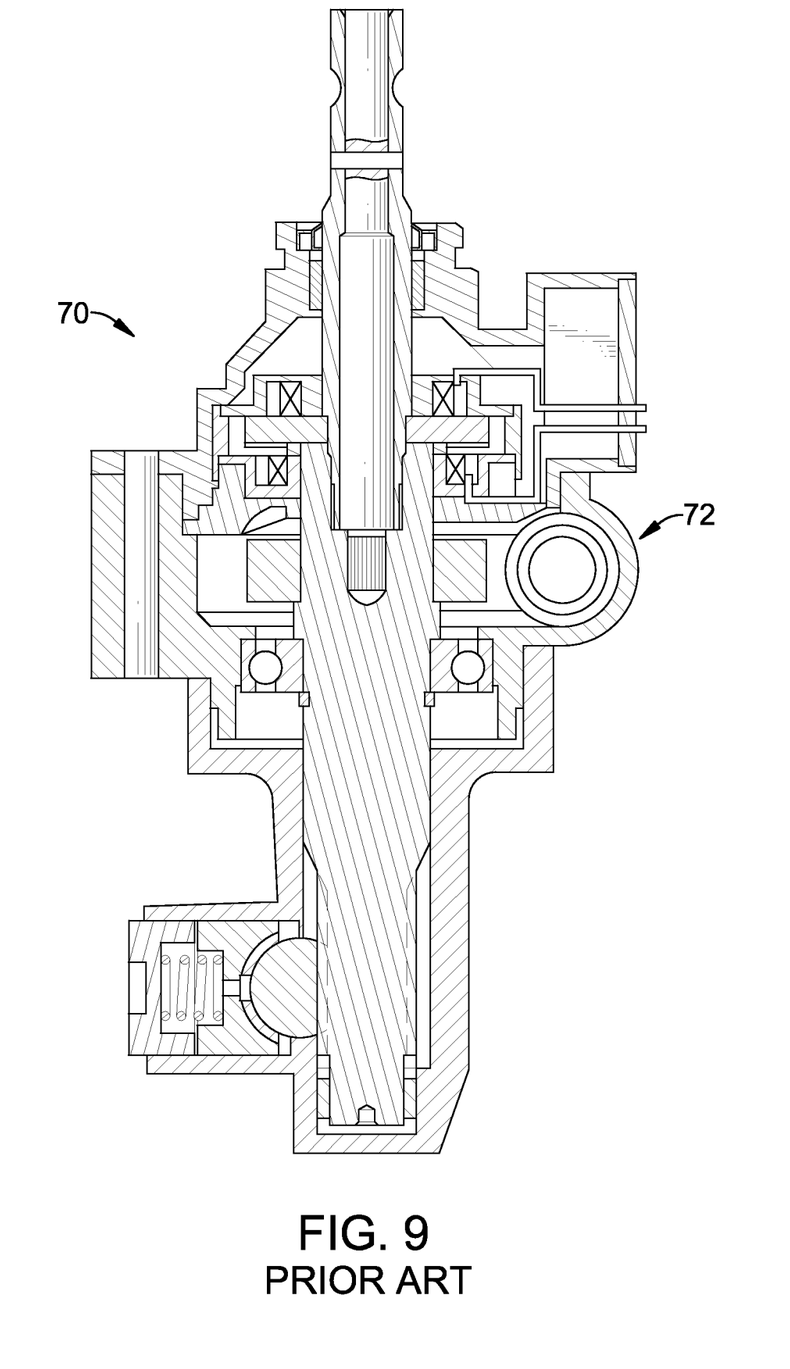
FIG. 9 is a side view in partial section of a conventional auxiliary module for a vehicle steering system in accordance with the prior art.

With reference to FIG. 9, a conventional pinion type of auxiliary device (70) for a vehicle steering system comprises a gear assembly (72) having a worm gear to transmit power provided by a motor to the steering system. However, the conventional auxiliary device (70) has the following drawbacks.
1. Long design term. The conventional auxiliary device (70) has to be designed and manufactured based on different types and structures of vehicles. The design term for the conventional auxiliary device (70) is long, and molds for manufacturing components of the specific conventional auxiliary device (70) have to be designed accordingly.
2. Low mechanical efficiency. The gear assembly (72) in the conventional auxiliary device (70) comprises a worm rod and a worm gear, but the mechanical efficiency of the conventional gear assembly (72) is low and about 85%. Therefore, the conventional auxiliary device (70) has high power/oil consumption and cost.
3. Troublesome repairing process. To repair or replace damaged component of the conventional auxiliary device (70), the auxiliary device (70) even the whole steering system has to be detached or disassembled. After the repairing or replacing process, the wheels of the vehicle should also be aligned again and this is inconvenient and time-consuming.

In addition, U.S. Pat. No. 7,412,906 disclosed a power steering system having a planetary gear transmission and an output drive gear that engages a driven gear mounted around an output shaft. However, the planetary gear transmission of the '906 Patent is far away from the output drive gear, such that the volume of the power steering system of the '906 Patent is too large to fit with a small vehicle. The power steering system disclosed by the '906 Patent is not versatile and convenient in use.

To overcome the shortcomings, the present invention tends to provide an electrical auxiliary module to mitigate or obviate the aforementioned problems.

SUMMARY OF THE INVENTION

The main objective of the invention is to provide an electrical auxiliary module for a vehicle steering system that can be individually detached from the vehicle steering system and has capabilities of easy designing and improving mechanical efficiency.

The auxiliary module comprises a gearbox, a motor, a torque detector and a controller. The gearbox has a casing, a sun gear, a planet gear assembly, a driven gear and a driving axle. The sun gear is mounted rotatably in the casing. The planet gear assembly is mounted in the casing, engages the sun gear and has a driving gear, multiple planet gears and an annular gear. The planet gears are mounted rotatably on the driving gear and engage the sun gear, and the driving gear serves as the planet carrier for the planet gears. The annular gear is mounted around and engages the planet gears. The driven gear is mounted rotatably in the casing and engages the driving gear. The driving axle is mounted co-axially on the driven gear and has two ends extending out from the casing. The motor is mounted on the casing of the gearbox with fasteners and is connected co-axially to the sun gear. The torque detector is mounted on the casing of the gearbox with fasteners and is mounted around the driving axle to detect torque applied on the driving axle. The controller is connected electrically to the motor and the torque detector to adjust torque output from the motor according to the torque detected by the torque detector.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 4, an electrical auxiliary module (10) for a vehicle steering system in accordance with the present invention comprises a gearbox (14), a motor (12), a torque detector (18) and a controller (20).

The gearbox (14) comprises a casing, a sun gear (121), a planet gear assembly (142), an annular gear (144), a driven gear (146) and a driving axle (16). The casing is mounted securely in a vehicle body, may be mounted securely on a transmission rod (51) of the vehicle steering system and comprises a hollow base (111) and a lid (112) attached securely to a top of the hollow base (111).

Figure 4:
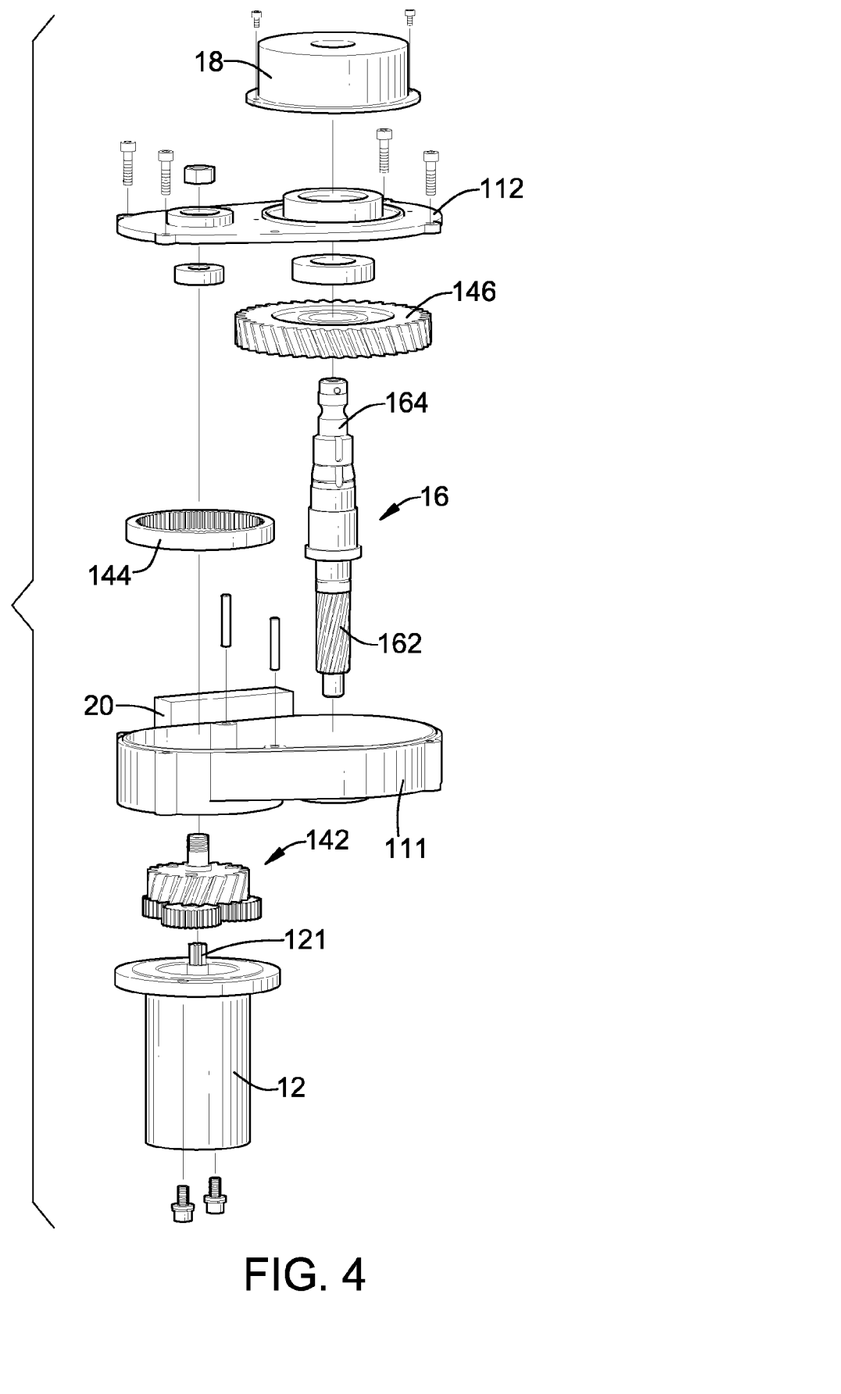
FIG. 4 is an exploded perspective view of the auxiliary module in FIG. 3.
Figure 5A:
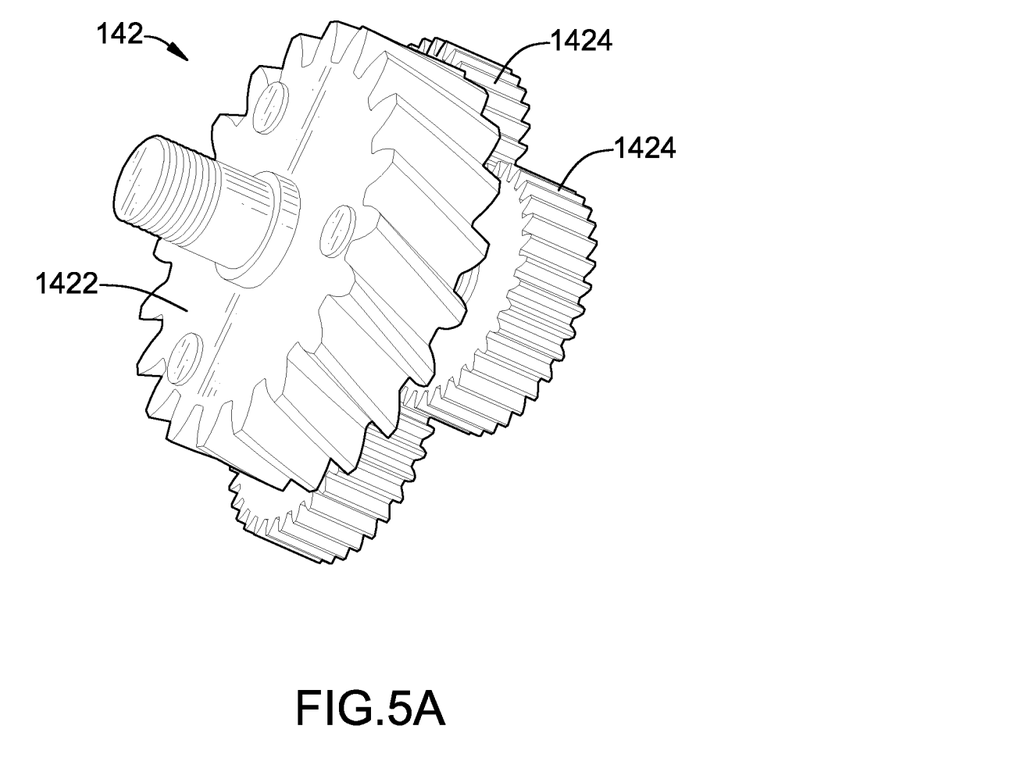
FIG. 5A is an enlarged perspective view of the planet gear assembly of the auxiliary module in FIG. 4.
Figure 5B:
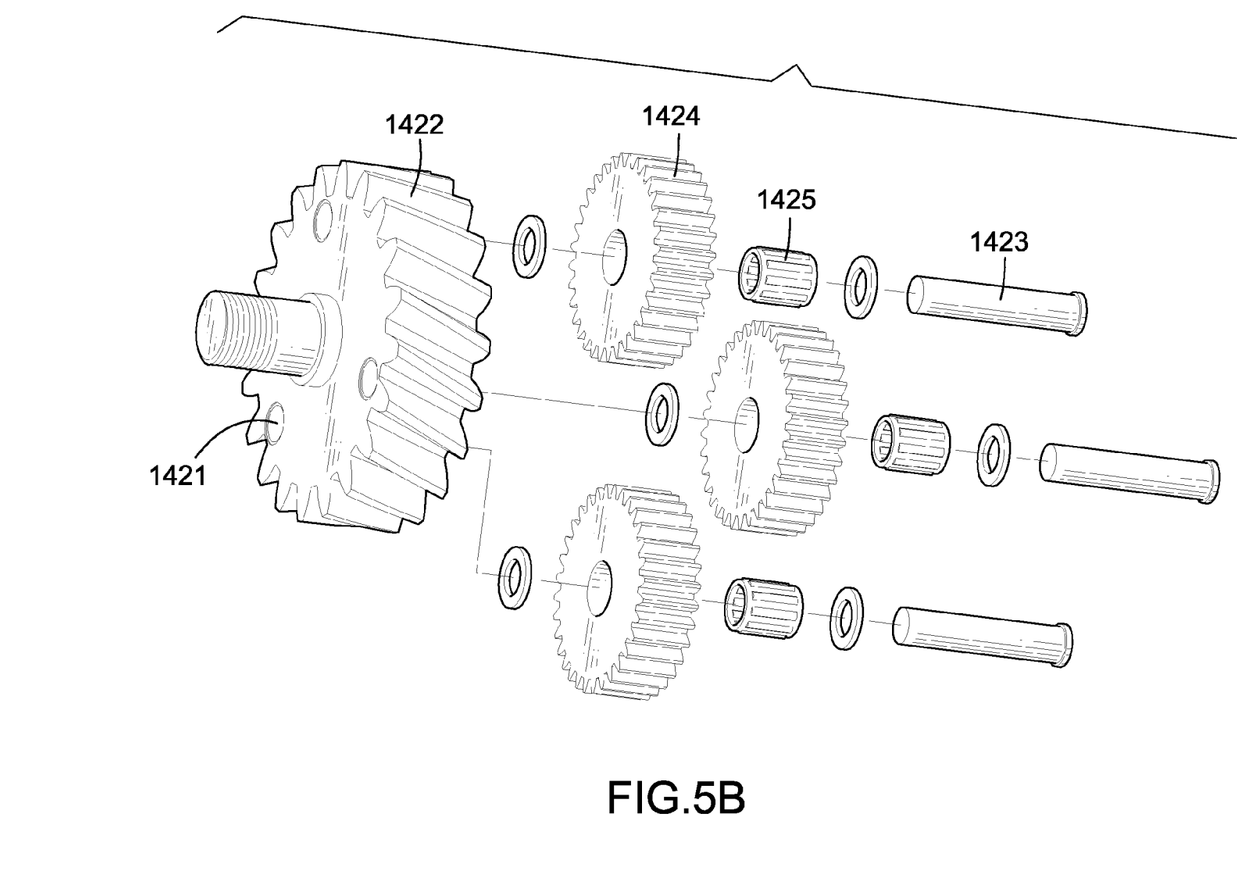
FIG. 5B is an exploded perspective view of the planet gear assembly of the auxiliary module in FIG. 4.

The sun gear (121) is mounted rotatably in the casing and is connected to and driven by the motor (12).

With reference to FIGS. 4, 5A, 5B and 6, the planet gear assembly (142) is mounted in the casing, engages the sun gear (121) and comprises a driving gear (1422) and multiple planet gears (1424). The planet gears (1424) are rotatably mounted on and attached to a side surface of the driving gear (1422) with axles (1423) and bearings (1425) and are mounted around and engage the sun gear (121). Preferably, the driving gear (1422) has multiple through holes (1421) defined through the driving gear (1422) and arranged in a circle at a center at the center of the driving gear (1422). The axles (1422) are respectively mounted in the through holes (1421) in the driving gear (1422) and are respectively mounted through the planet gears (1424). Accordingly, the planet gears (1424) are rotatably mounted on and attached to the side surface of the driving gear (1422) with axles (1423) and bearings (1425), and the driving gear (1422) serves as a planet carrier for the planet gears (1424). Therefore, to mount another planet carrier for the planet gears (1424) is not necessary, such that the structure of the electrical auxiliary module (10) can be simplified.

The annular gear (144) is mounted in the base (111) and is mounted around and engages the planet gears (1424). With the arrangement of the annular gear (144), the rotation of the planet gears (1424) is stable, and a gear ratio between the driving gear (1422) and the sun gear (121) can be defined. In addition, because the planet gears (1424) are attached on a side surface of the driving gear (1422) and the driving gear (1422) serves as the planet carrier for the planet gears (1424), the planet gears (1424) are not away from the driving gear (1422) and the volume of the casing in which the planet gears (1424) and the driving ear (1422) are mounted can be minimized. Accordingly, the electrical auxiliary module (10) in accordance with the present invention is compact and can be applied to a small vehicle and is versatile and convenient in use.

Figure 6:
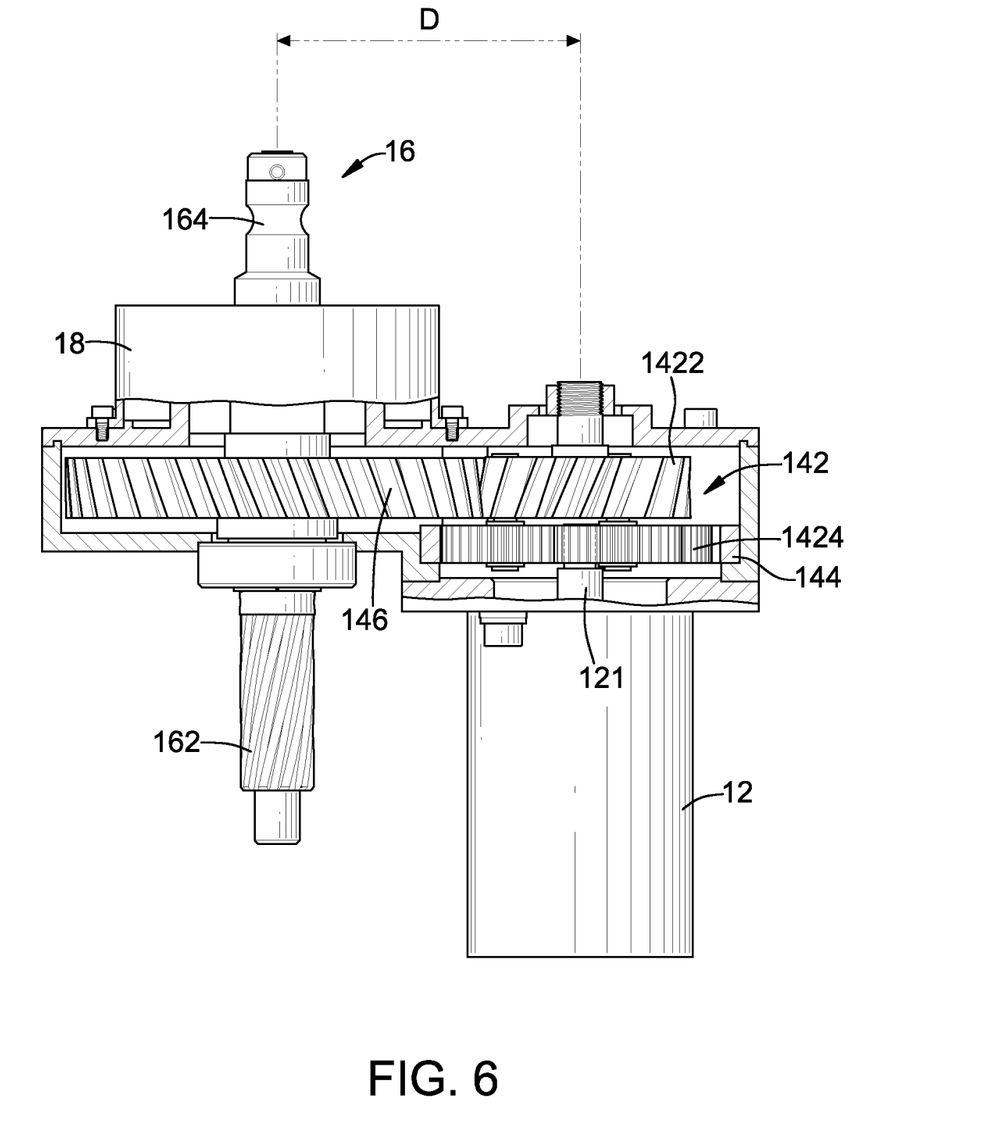
FIG. 6 is a side view in partial section of the auxiliary module in FIG. 4.

The driven gear (146) is mounted rotatably in the casing and engages the driving gear (1422), wherein the driving and driven gear (1422,146) can be helical gears. The gear ratio between the driving and driven gears (1422,146) may be selected based on specifications of different vehicles and may be 2 to 2.5. The gear ratio between the driving and driven gears (1422,146) is various to fit with different needs or designs of vehicles, so the design process and cost can be simplified and reduced.

Figure 1:
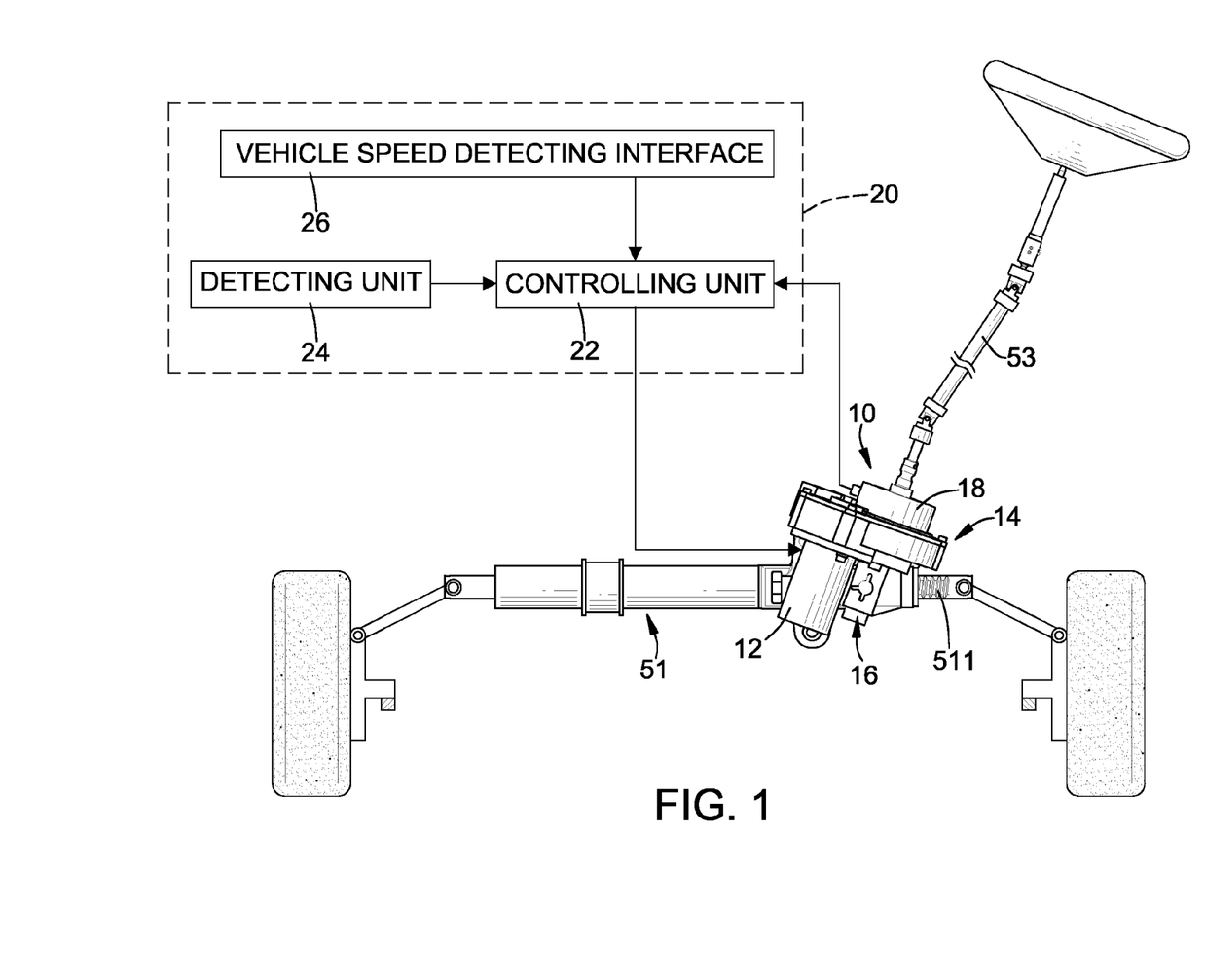
FIG. 1 is a schematic diagram of a vehicle steering system with an auxiliary module in accordance with the present invention.
Figure 2:
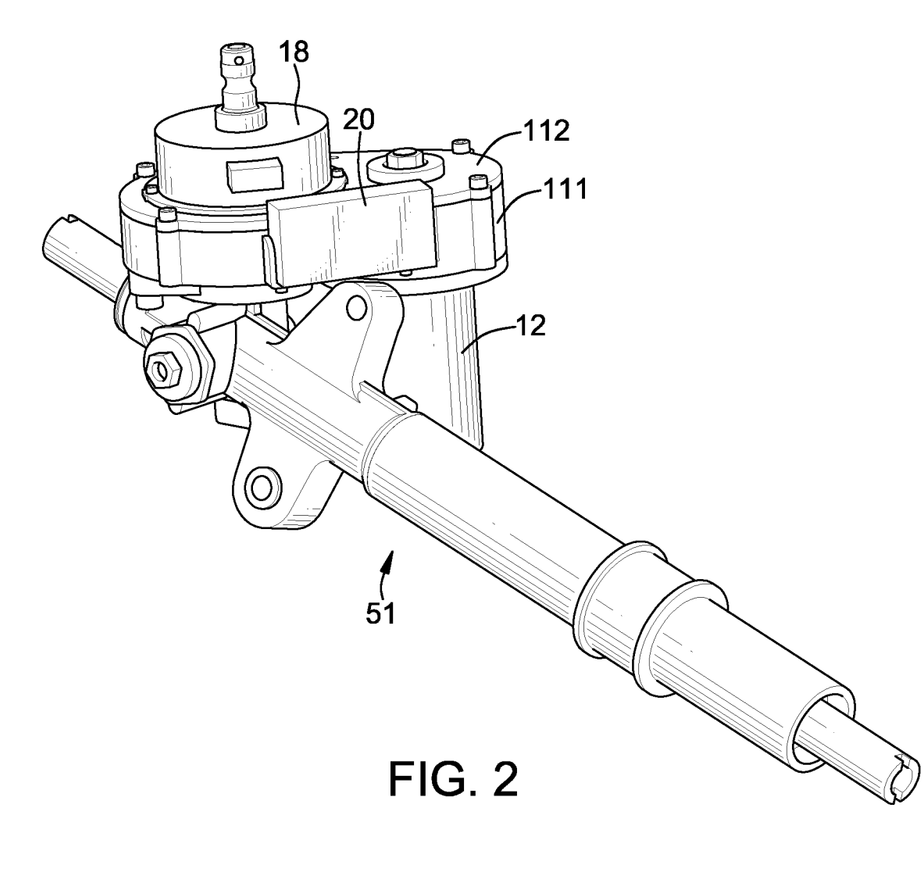
FIG. 2 is a perspective view of the auxiliary module in FIG. 1 with a transmission rod of the vehicle steering system.
Figure 3:
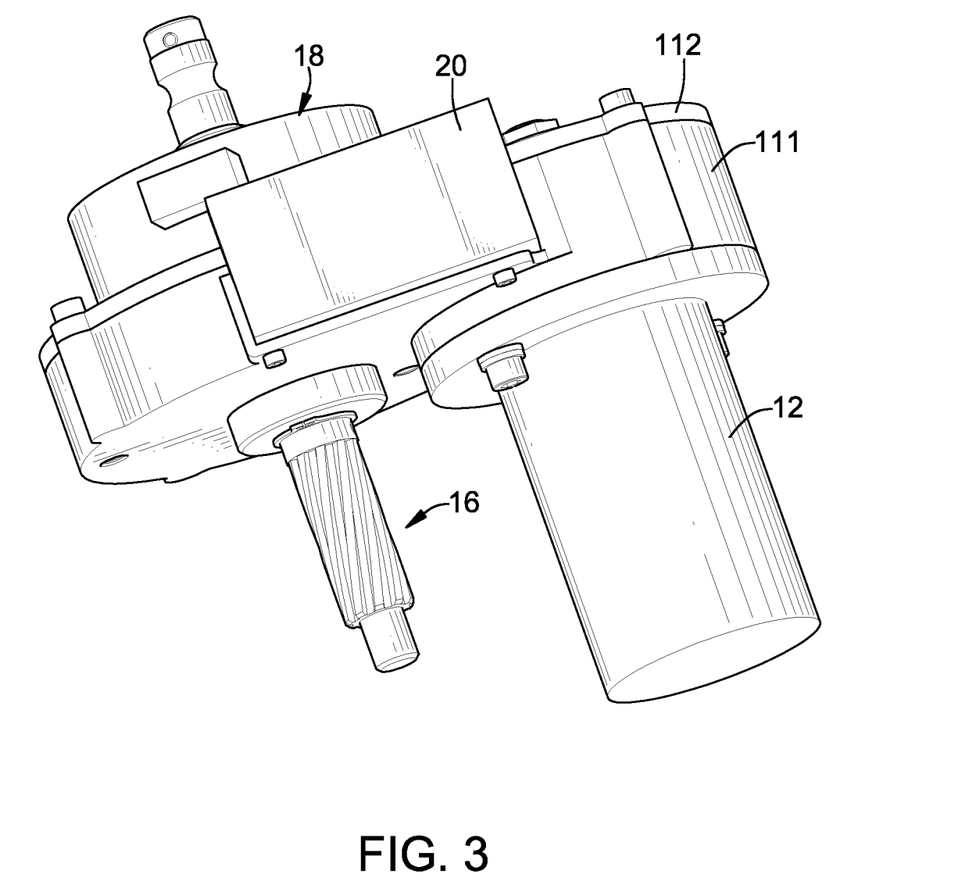
FIG. 3 is a perspective view of the auxiliary module in FIG. 1.

With further reference to FIG. 1, the driving axle (16) is mounted co-axially on the driven gear (146) and has two ends (162,164) extending out from the casing and including a top end (164) and a bottom end (162). The bottom end (162) of the driving axle (16) is connected to and engages a rail (511) mounted on the transmission rod (51), the top end (164) is connected to a steering rod (53) of the vehicle steering system. Additionally, the driving axle (16) may further have teeth formed on the bottom end (162) of the driving axle (16) to connect to and engage the rail (511) of the transmission rod (51).

The gear ratio relationship between the sun gear (121) and the planet gear assembly (142) of the gearbox (14) is shown as following equation:

$$\phi_1 + (N_{3\text{-}1} \times \phi_3) - (N_{3\text{-}1}+1)\phi_2 = 0$$

$$N_{3\text{-}1} = T_3/T_1$$

Wherein, $\phi_1$ is the angular speed of the sun gear (121), $\phi_3$ is the angular speed of the annular gear (144) (may be zero because the annular gear (144) is stationary), $N_{3\text{-}1}$ is the gear ratio of the sun gear (121) and the annular gear (144), $T_1$ is the tooth number of the sun gear (121), $T_3$ is the tooth number of the annular gear (144) and $\phi_2$ is the output angular speed.

For example, with reference to FIG. 6, if the gear ratio of the planet gear assembly (142) is 1/10 and the gear ratio between the driving and driven gears (1422,146) is 1/2, the gear ratio between the motor (12) and the driving axle (16) is 1/20. With the various gear ratio between the driving and driven gears (1422,146) of 2 to 2.5, the gear ratio between the motor (12) and the driving axle (16) may be 1/20 to 1/25. Additionally, the gear ratio of the planet gear assembly (142) may also be various, so the gear ratio of the gearbox (14) can be varied to fit with different needs of designs for different vehicles easily and conveniently. With the arrangement of the gearbox (14) with the planet gear assembly (142), the mechanical efficiency of the auxiliary module (10) can be improved to reduce the consumption of power and oil and the cost of using the auxiliary module (10).

The gear ratio between the driving and driven gears (1422, 146) is variable at a fixed shaft distance D between the shaft around which the driving gear (1422) is mounted and the driving axle (16) as shown in FIG. 6. Accordingly, the gear ratio between the driving and driven gears (1422,146) can be changed based on different needs or designs for different vehicles, so that the electrical auxiliary module (10) in accordance with the present invention is versatile in use.

The motor (12) is attached securely but detachably to the base (111) of the casing with fasteners, is connected co-axially to the sun gear (121) and has a rotating shaft extending into the base (111) of the casing and connected securely with the sun gear (121).

The torque detector (18) is mounted on the casing of the gearbox (14) with fasteners, is mounted around the top end (164) of the driving axle (16) to detect torque applied on the driving axle (16) and may be an electrical or electromagnetic type or have a torque rod. The torque detector (18) can detect a torque applied onto the steering rod (53) and the top end (164) of the driving axle (16) when a driver rotates a steering wheel and send the detected result to the controller (20).

With reference to FIG. 1, the controller (20) is connected electrically to the motor (12) and the torque detector (18) to adjust torque output from the motor (12) according to the result detected by the torque detector (18). The controller (20) comprises a controlling unit (22), a detecting unit (24) and a vehicle speed detecting interface (26). The detecting unit (24) is connected electrically to the controlling unit (22) and can detect multiple vehicle statuses, such as tire pressure (tire puncture or not) or conditions of an anti-lock braking system (slipping or not) or air bags (bumping against another object or not) and sends the detected signals to the controlling unit (22). The vehicle speed detecting interface (26) can detect the vehicle speed and sends the detected result to the controlling unit (22).

The controlling unit (22) is connected electrically to the motor (12) and the torque detector (18) and receives signals sent from the torque detector (18), the detecting unit (24) and the vehicle speed detecting interface (26) to change the torque provided by and rotating speeds of the rotating shaft of the motor (12). Accordingly, an auxiliary steering effect can be provided to the steering system of the vehicle.

For example, if the driver wants to turn the vehicle and rotates the steering wheel, the torque detector (18) detects the change of torque/resistance between the steering rod (53) and the driving axle (16). The controlling unit (22) determines whether the vehicle is under an unusual or specific condition, such as slipping based on the signals detected by the detecting unit (24) and the vehicle speed detecting interface (26). Accordingly, to reduce or increase the turning torque is judged by the controlling unit (22), and an intelligent auxiliary effect to the steering system is provided.

Figure 7A:
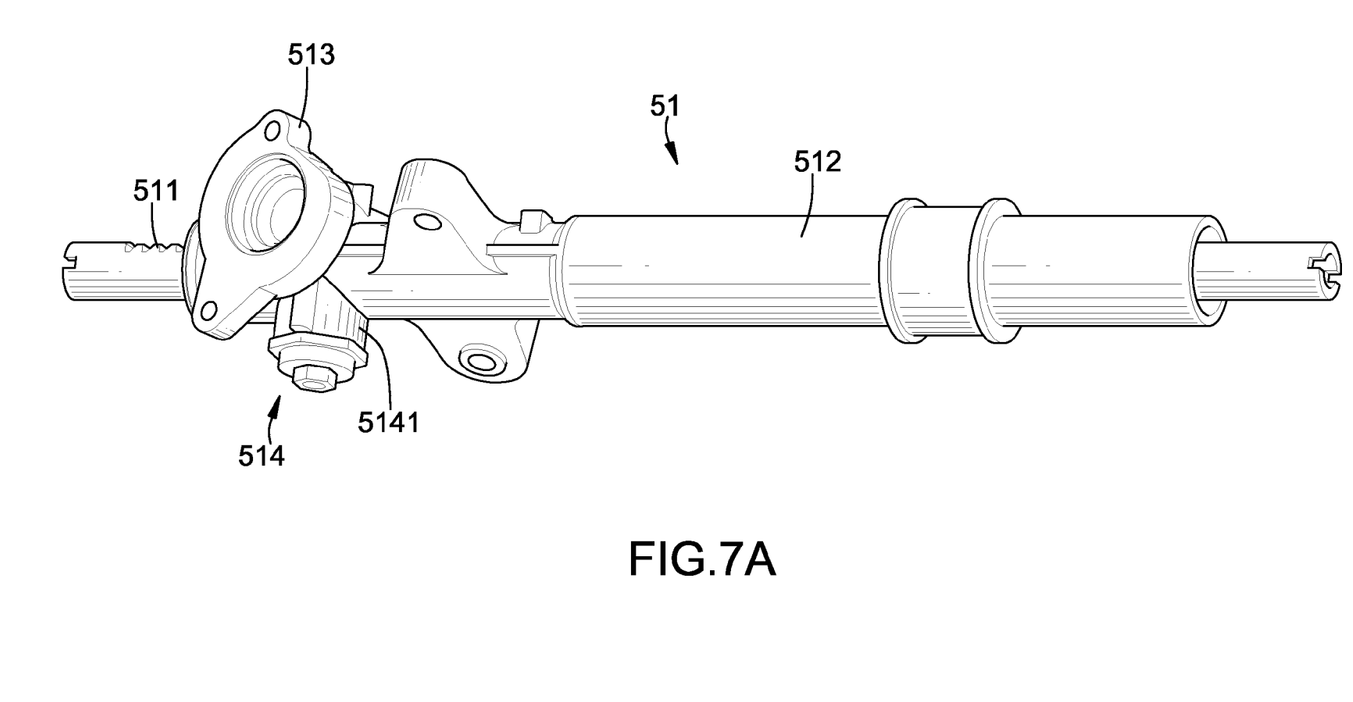
FIG. 7A is a perspective view of the transmission rod of the vehicle steering system in FIG. 2.
Figure 7B:
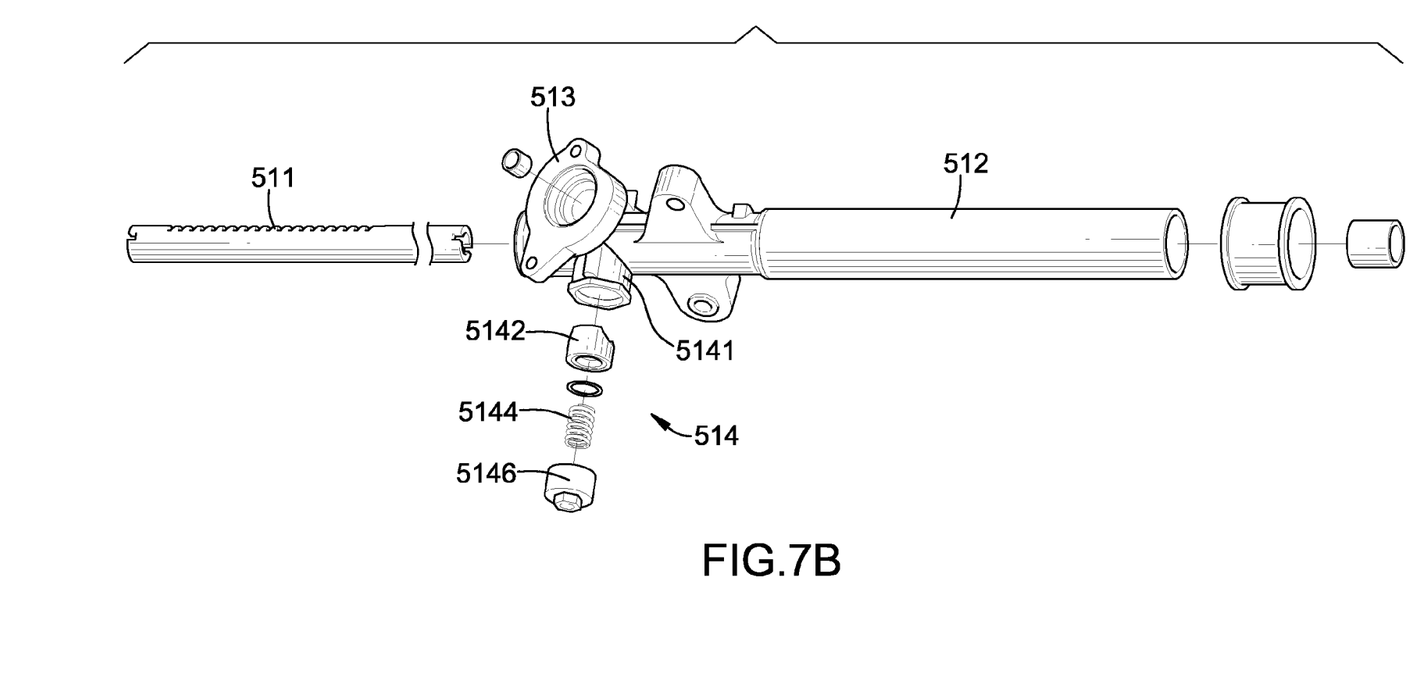
FIG. 7B is a partially exploded perspective view of the transmission rod of the vehicle steering system in FIG. 7A.

To connect the auxiliary module (10) with the transmission rod (51), with reference to FIGS. 6, 7A and 7B, the transmission rod (51) has a tube (512), a rail (511), a connection base (513) and an adjusting device (514). The rail (511) is mounted movably in the tube (512) and engages the teeth formed on the driving axle (16). The connection base (513) is formed on the tube (512), is connected securely with the casing with fasteners and has a chamber communicating with the tube (512) and allows the bottom end (162) of the driving axle (16) being inserted into the chamber. The adjusting device (514) comprises an adjusting base (5141), a plug (5142), a spring (5144) and an adjusting nut (5146). The adjusting base (5141) is mounted or formed on the tube (512) at a position aligning where the teeth on the driving axle (16) engage the rail (511). The plug (5142), the spring (5144) and the adjusting nut (5146) are mounted in the adjusting base (5141) in sequence. The plug (5142) abuts against the rail (511), and the spring (5144) provides a force to push the plug (5142) abutting against the rail (511). The adjusting nut (5146) is screwed into the adjusting base (5141). When the adjusting nut (5146) is rotated, the spring (5144) will be compressed or released and the force applied to the plug (5142) can be adjusted. Therefore, the engagement force between the driving axle (16) and the rail (511) can be accordingly adjusted. The auxiliary module (10) in accordance with the present invention is modularized and can be deemed as a standard component, and the transmission rod (51) is various based on different needs of designs. Accordingly, the design term for a vehicle steering system with an auxiliary module can be efficiently shortened.

Figure 8A:
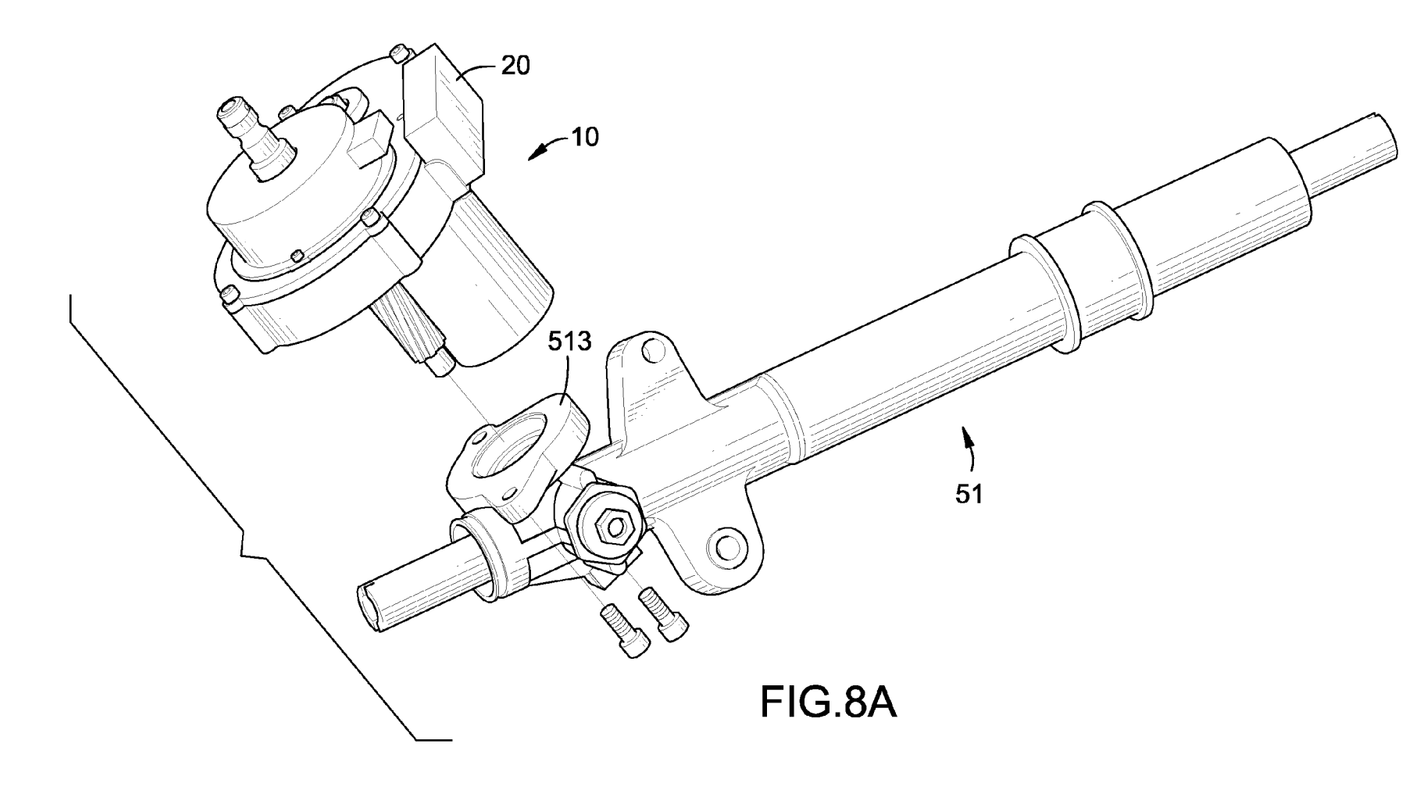
FIG. 8A is an exploded perspective view of the auxiliary module with the transmission rod in FIG. 2 showing the auxiliary module being detached from the transmission rod.
Figure 8B:
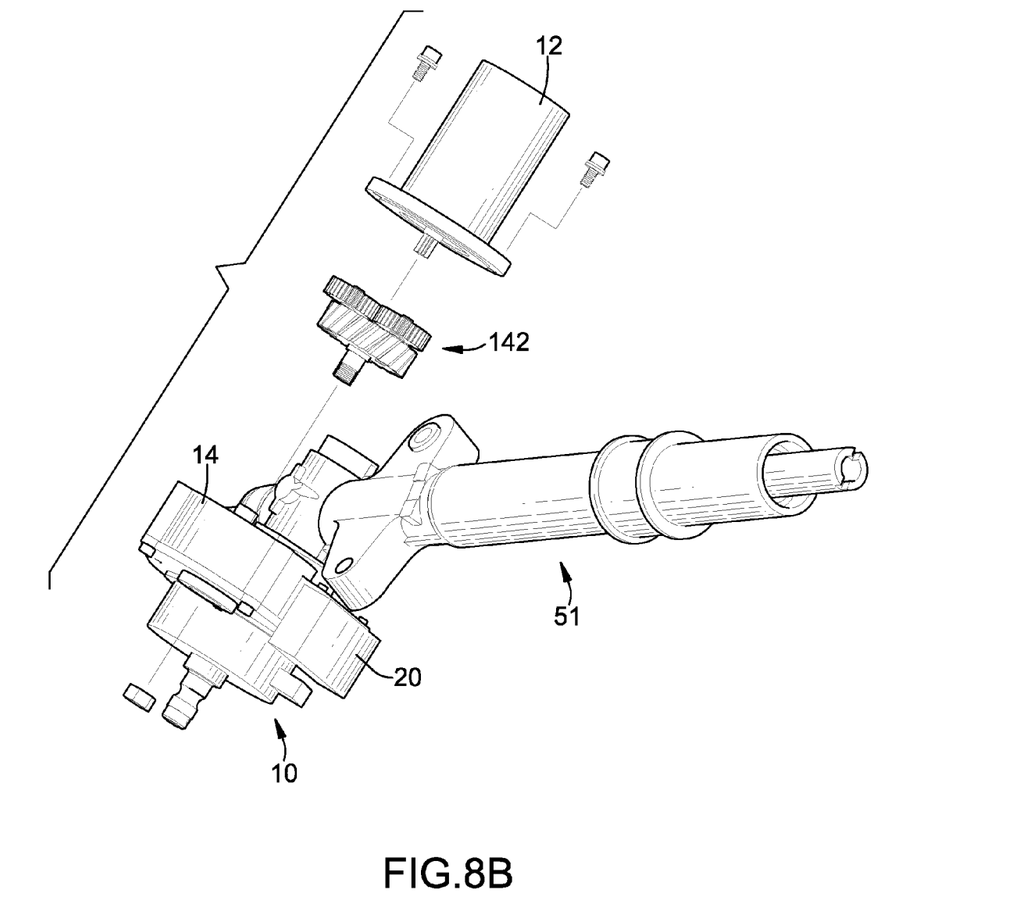
FIG. 8B is an exploded perspective view of the auxiliary module with the transmission rod in FIG. 2 showing the motor and the planet gear assembly being detached from the casing of the auxiliary module.
Figure 8C:
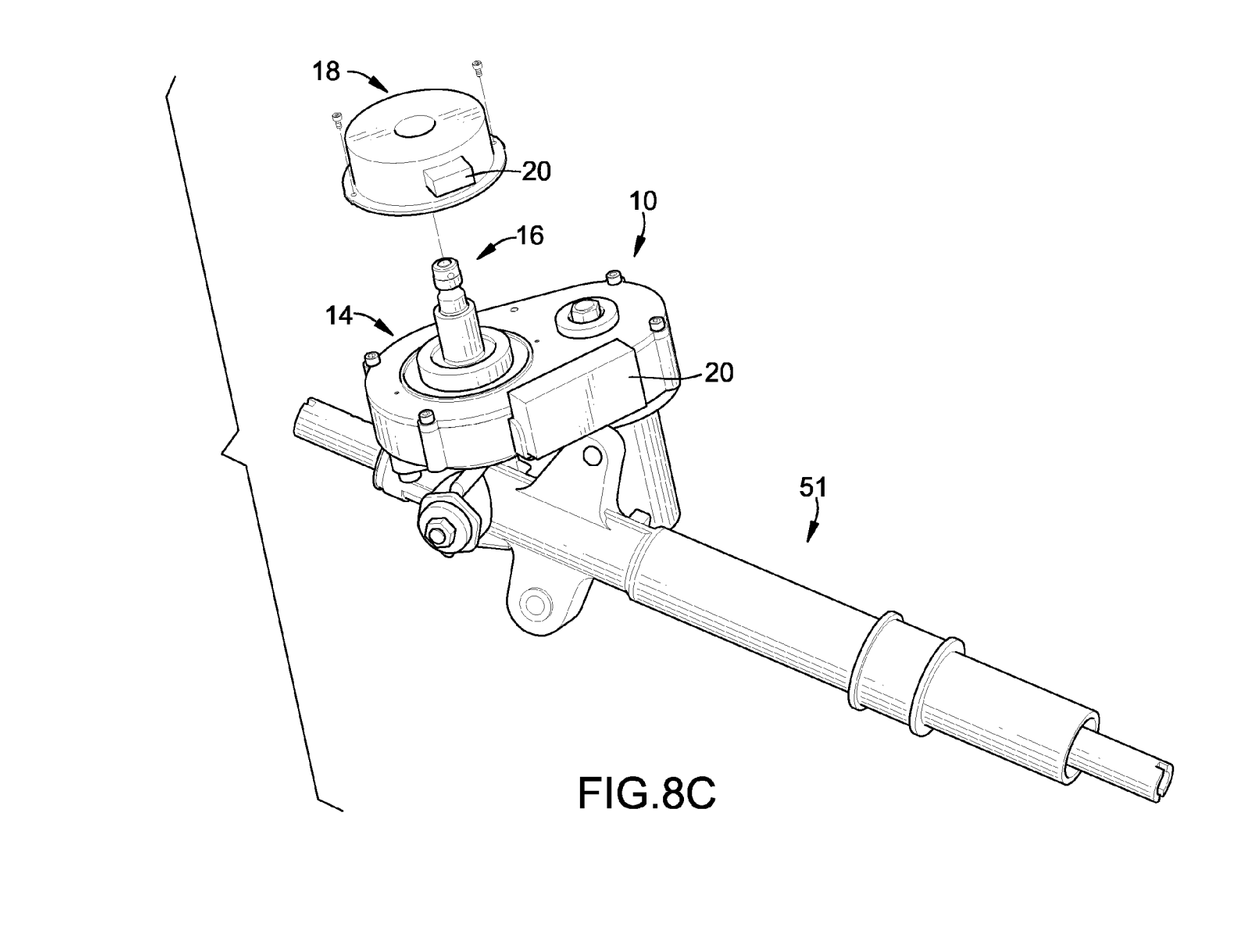
FIG. 8C is an exploded perspective view of the auxiliary module with the transmission rod in FIG. 2 showing the torque detector being detached from the casing of the auxiliary module.

With reference to FIG. 8A, because the casing of the auxiliary module (10) is mounted securely on the connection base (513) on the transmission rod (51) with fasteners, such as bolts, the auxiliary module (10) can be easily and conveniently detached from the connection base (513) for replacement or repair. With reference to FIGS. 8B and C, because the motor (12) and the torque detector (18) are mounted securely on the casing with fasteners, the motor (12), the planet gear assembly (142) and the torque detector (18) can also be individually detached from the casing easily and conveniently. Therefore, to detach or disassemble the whole steering system is unnecessary when some elements of the steering system are damaged, and wheel alignment after repairing or replacing damaged element is also unnecessary.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical auxiliary module for a vehicle steering system comprising:
    a gearbox having
        a casing;
        a sun gear mounted rotatably in the casing;
        a planet gear assembly mounted in the casing, engaging the sun gear and having
            a driving gear having a center and multiple through holes defined through the driving gear and arranged in a circle about the center of the driving gear;
            multiple planet gears rotatably mounted on and attached to a side surface of the driving gear with axles and engaging the sun gear, wherein the axles are respectively mounted in the through holes in the driving gear and respectively mounted through the planet gears, and the driving gear serves as a planet carrier for the planet gears;
            an annular gear mounted around and engaging the planet gears;
        a driven gear mounted rotatably in the casing and engaging the driving gear; and
        a driving axle mounted co-axially on the driven gear and having two ends extending out from the casing;
    a motor mounted on the casing of the gearbox with fasteners and connected co-axially to the sun gear;
    a torque detector mounted on the casing of the gearbox with fasteners and mounted around the driving axle to detect torque applied on the driving axle; and
    a controller connected electrically to the motor and the torque detector to adjust torque output from the motor according to the torque detected by the torque detector, wherein
    the controller comprises
        a controlling unit connected electrically to the motor and the torque detector to change torque provided by and rotating speeds of a rotating shaft of the motor;
        a detecting unit connected electrically to the controlling unit for detecting multiple vehicle statuses and sending detected signals to the controlling unit; and
        a vehicle speed detecting interface electrically connected to the controlling unit for detecting vehicle speed and sending detected result to the controlling unit; and
    a gear ratio relationship between the sun gear and the planet gear assembly of the gearbox is shown as following equation:

$\phi_1 + (N_{3-1} \times \phi_3) - (N_{3-1} + 1)\phi_2 = 0$ $N_{3-1} = T_3/T_1$ Wherein, $\phi_1$ is an angular speed of the sun gear, $\phi_3$ is an angular speed of the annular gear, $N_{3-1}$ is a gear ratio of the sun gear and the annular gear, $T_1$ is tooth number of the sun gear, $T_3$ is tooth number of the annular gear and $\phi_2$ is the output angular speed.

* * * * *